United States Patent [19]

Steele et al.

[11] Patent Number: 4,976,288
[45] Date of Patent: Dec. 11, 1990

[54] TUBING BEND FOR PNEUMATIC CONVEYING SYSTEM

[75] Inventors: James R. Steele, Stillwater, Minn.; Leonard Williams, Aylesbury, United Kingdom

[73] Assignee: Dynamic Air, Inc., St. Paul, Minn.

[21] Appl. No.: 370,253

[22] Filed: Jun. 22, 1989

[51] Int. Cl.⁵ .................. D03D 21/00; F16L 13/04
[52] U.S. Cl. ............................. 138/120; 138/155; 138/39; 406/191; 406/86; 406/45
[58] Field of Search ............... 138/120, 155, 39, 37, 138/120, 155; 406/45, 86, 195, 191; 285/175, 176, 405, 412, 129

[56] References Cited

U.S. PATENT DOCUMENTS

| | | | |
|---|---|---|---|
| 1,561,448 | 11/1925 | Simon | 138/120 |
| 1,567,369 | 12/1925 | Holst | 138/120 |
| 2,654,619 | 10/1953 | Gaum | 285/179 |
| 3,379,219 | 4/1968 | Schuh et al. | 138/120 |
| 4,074,553 | 2/1978 | Woodrow | 138/155 |
| 4,239,264 | 12/1980 | Evans | 138/120 |
| 4,703,135 | 10/1987 | Magnani | 138/120 |

Primary Examiner—Timothy F. Simone
Assistant Examiner—Gary K. Graham
Attorney, Agent, or Firm—Jacobson and Johnson

[57] ABSTRACT

Tubing or pipe bend or elbow for use in carrying pneumatically conveyed granular material has an axial bore with an input opening at one end and gradually diminishes to a smaller opening at the output end, such that the incoming material sees a pressure relief, or drop, at the input to the bend. As a feature, a tubing bend may be segmented, i.e., made out of a series of separate or individual bends with the output of one coupled to the input of another.

4 Claims, 2 Drawing Sheets

TUBING BEND FOR PNEUMATIC CONVEYING SYSTEM

FIELD OF THE INVENTION

In pneumatic conveying systems a wide range of dry bulk solid granular materials such as sand, flour, fine coal, soda ash, sugar, etc., are conveyed in tubes or pipes or conduits by a small amount of pressurized air. In dense-phase systems, there is usually a heavy concentration of material that is moved at relatively low velocities, somewhat like pushing or extruding the material through the conduit. In dilute phase systems, larger amounts of air are used to move less dense materials at high velocities while in suspension in the air. Generally, air is added along the conveying line as needed to keep the material moving to compensate for friction, air leakage, etc. Typically, in a conventional pneumatic conveying system granular bulk material is fed from a bulk storage tank, such as a railway tank car or truck, into a pressurized transporter and from there is carried by conduits or pressurized pipes or lines to various processing locations where the material may be mixed with other materials, weighed, and bagged. The conveying line normally has a number of bends necessary to carry the material to and from the various processing stations to avoid obstacles, and to keep the system confined in a certain area. Typically, with no limitation intended, the material may have to be conveyed from the bottom of a transporter up to the top of the container for a mixer or blender and then carried out the bottom of the mixer or blender into the top of a bagging machine, all of which requires a number of bends in the conveying line. Typically, with no limitation intended, the bend may be slight, as little as about fifteen degrees, on up to a ninety degree bend, or possibly even greater. Typically, the tubing bend or elbow may be made out of cast iron and has a suitably sized, relatively smooth axial bore smoothly curved at a constant radius of curvature, the degree of curvature depending upon the desired amount of bend.

It has been found that at times the granular material tends to compact in or even plug up the passageway as it travels down the bore of a tubing bend. Also, there is often severe abrasion of the inner surface of the tubing bend bore concentrated in small or localized areas.

SUMMARY OF THE INVENTION

The present invention provides tubing bend or conduit with the axial bore having a larger opening at the inlet for receiving the pneumatically conveyed granular material than at the outlet opening so that the incoming material sees a pressure drop or pressure relief as it enters the bend. The bore decreases in size between the inlet and outlet openings at a constant gradient so the transition is smooth and gradual. As a result the material moves easier and more uniformly through the bend to minimize or virtually eliminate any compacting or plugging of the material within the bore, and to reduce the amount of localized severe abrasion occurring within the bore. As a benefit, it is possible to use lower air pressure to move the material due to the material flowing more easily and smoothly. As a further feature, the tubing bend may be segmented so that individual sections can be joined, if needed, to provide the amount of bend needed. Also, in the event of continued localized abrasive wear, a single section or segment can be replaced rather than replacing the entire bend.

DESCRIPTION OF PREFERRED EMBODIMENTS

Figure 1:
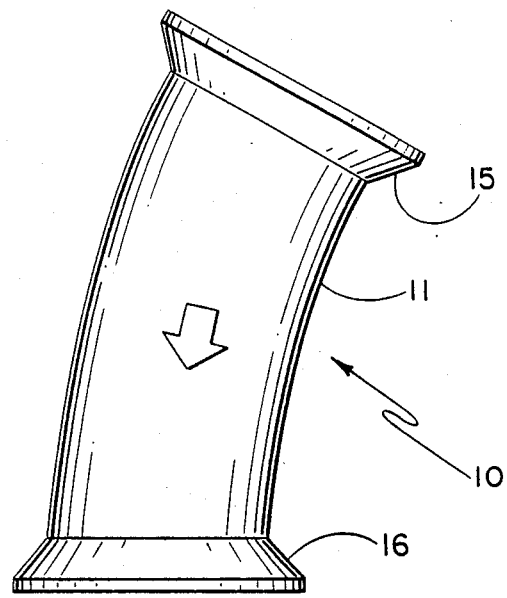
FIG. 1 is an illustration of a tubing bend constructed according to the teachings of this invention.

FIG. 1 illustrates a unitary arcuate tubing bend or elbow 10 which is curved at a constant radius of curvature. Typically, for exemplary purposes only, tubing bend or elbow 10 may range from about a fifteen degree to about a ninety degree radius of curvature. Tubing bend 10 comprises a conduit having an outer shell 11, generally cast out of iron, and a hollow axial bore 12 for transporting or conveying granular material moved along by air pressure within the bore. At one end bore 12 has circular inlet opening 13 having a diameter larger than the outlet opening 14 at the other end with the bore gradually and smoothly decreasing from the inlet towards the outlet so that the change in dimension between the two openings is gradual and smooth. At each end tubing bend or elbow 10 has outward flaring flanges 15 and 16.

In use, a conduit or pipe or tube carrying the pneumatically conveyed granular material is coupled to the input end of the tubing bend with the bore or opening of the pipeline having a diameter somewhat smaller than the opening 13 at the input end of tubing bend 10 and with the two openings centered or axially aligned. The output end of tubing bend 10 may be similarly attached to a pipeline or conduit, not shown, having an opening in communication with and axially aligned with outlet opening 14 in tubing bend 10. Because of the expanded area at the input of tubing bend 10, the pressurized granular material coming into the tubing bend sees a pressure relief or pressure drop and as a result it has been found that the flow of the granular material through bore 12 to the output end and output opening 14 moves easier and more uniformly through the bend and is less likely to compact or plug in the bend. It has also been found that the pressure relief or pressure drop provided at the input in this fashion serves to minimize localized severe abrasion by the granular material at the interior of the bend.

Figure 2:
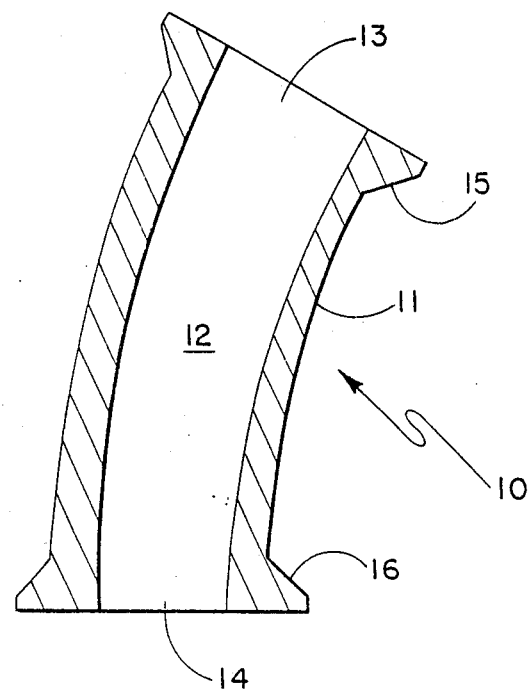
FIG. 2 is a sectioned view of the tubing bend illustrated in FIG. 1.
Figure 3:
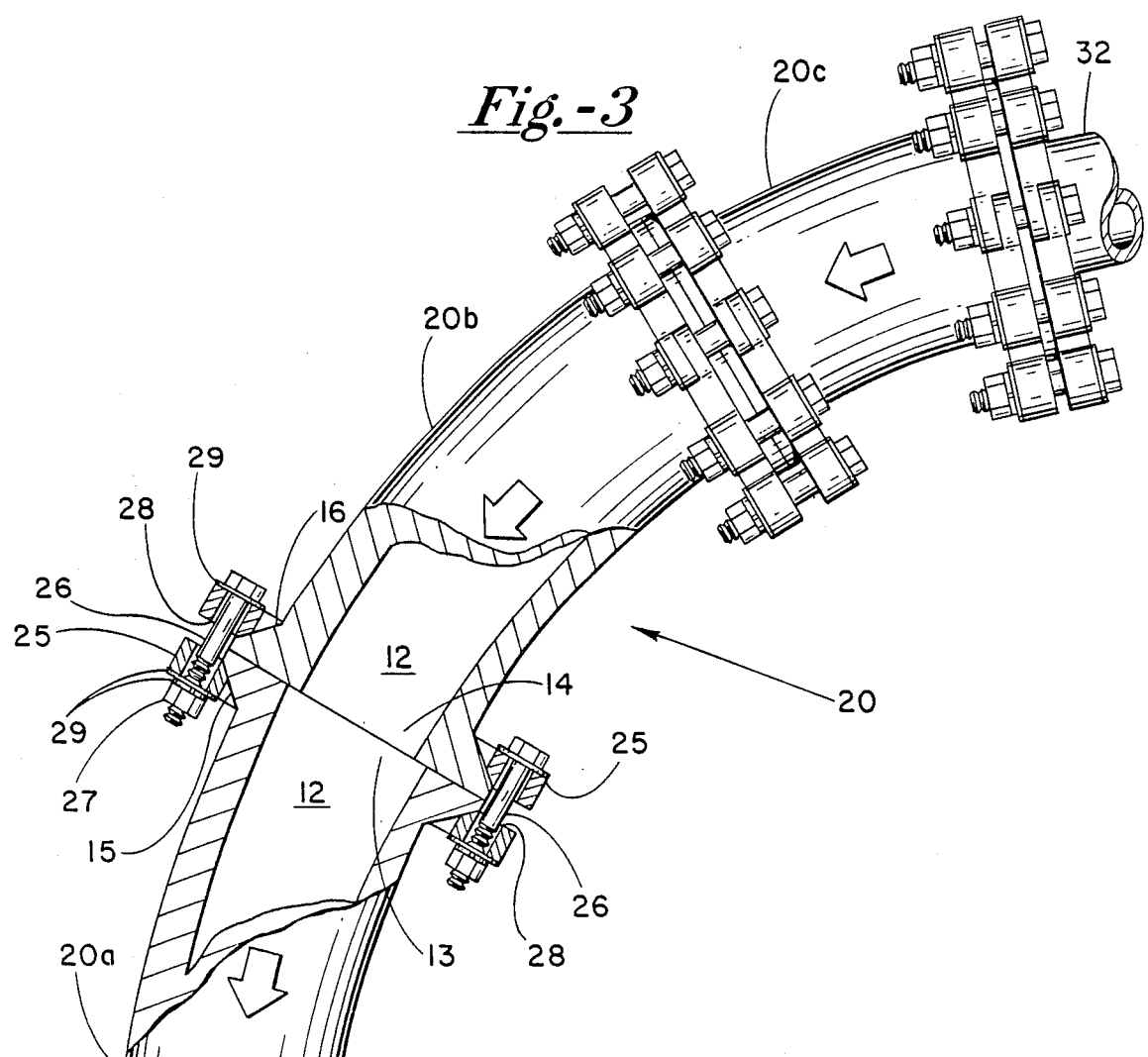
FIG. 3 is a segmented tubing bend constructed according to the teachings of this invention.

FIG. 3 illustrates a segmented tubing bend or elbow 20 made up of a series of individual or separate tubing bends 20A, B and C each of which is similar to bend 10 in FIGS. 1 and 2. For descriptive purposes only, the radius of curvature of tubing bend 20 may be seventy-five degrees and is made by connecting together two thirty degree bends, 20A and 20B, and a fifteen degree bend 20C. Except for the differences in their respective radius of curvature, tubing bends 20A, B and C are constructed in the same fashion as tubing bend 10 in FIGS. 1 and 2. Each has an axial bore 12 with an input opening 13 larger than the outlet opening 14 for receiving pneumatically conveyed granular material with the bore diminishing or reducing at a constant gradient from the input end to output end. The segments are attached together with the input end of segment 20A attached to the output of segment 20B and the input of the latter attached to the output of segment 20C. The segments are joined together in axial alignment with the respective openings centered with respect to one another, so that the flow of the granular material exiting one of the tubing bend segments when entering the next tubing bend segment sees the pressure relief or drop in the same manner as described earlier with respect to bend 10. Generally, each end of bend 20 is coupled to an associated device such as conveying line or conduits 32 and 33 or to a processing device such as a blender or transporter, not shown.

Figure 4:
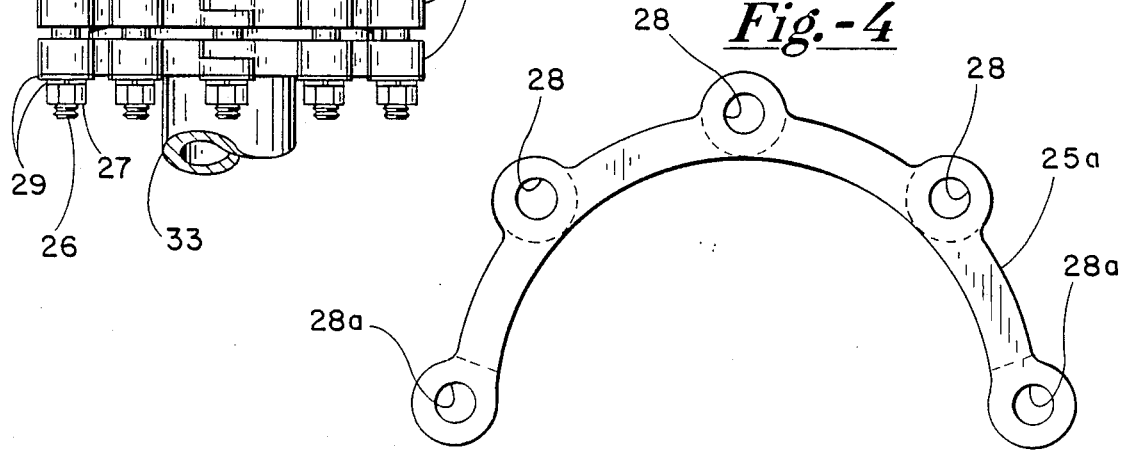
FIG. 4 illustrates a clamping ring for attaching a tubing bend to the conveying system.

The ends of segments 20A, B and C are attached and held together by a pair of split ring clamps 25. Each ring clamp 25 is made up of two identical halves, only one, 25A, of which is shown in FIG. 4. Each half of one ring clamp 25 is slipped over the outside of the segment near a flanged end with the end eyelets 28A of each half of each ring overlapping the corresponding end eyelets of the other half of the ring. Another ring clamp 25 is slipped in similar fashion over the flanged area at the mating end of the adjoining segment with respective eyelets in alignment. The ring clamps 25 are then drawn tightly together by a combination of bolts 26 passing through eyelets 28 in the rings and threaded onto nuts 27 with suitable spacers and washers, identified collectively by reference 29, as needed. In this fashion, if one section of segmentized tubing bend 20 should encounter severe internal abrasion it can be replaced without having to replace the entire tubing bend.

We claim:

1. Segmented tubing bend for use in a system for pneumatically conveying granular materials comprising:
    a plurality of arcuate conduits; each of said conduits having a constant radius of curvature and a hollow bore with an input opening at one end of said bore narrowing at a constant gradient to a smaller outlet opening at the other end; and
    means for making a substantially air tight releasable attachment of the outlet end of one of said conduits to the input end of another of said conduits to provide an air pressure drop at the input of said another conduit.

2. Segmented tubing bend for a pneumatic conveying system, comprising:
    a plurality of arcuate conduits, each conduit having a constant radius of curvature;
    each of said conduits having a hollow axial bore with an input opening at one end for receiving pneumatically conveyed granular material and an outlet opening at the other end for outputting said material;
    each of said bores gradually diminishing from the input opening to a smaller outlet opening; and
    means releasably attaching substantially air tight the outlet end of one of said conduits to the input end of another of said conduits with the respective bores centered with respect to one another for producing an air pressure drop at the input of said another conduit.

3. Tubing bend for a pneumatic conveying system, comprising:
    an arcuate tubular conduit having a constant radius of curvature and a generally constant outer diameter;
    a hollow bore in said conduit extending from an input end to an output end, said bore having a circular opening at the input end with a greater diameter than a coaxial circular opening at the output end, said bore narrowing at a constant gradient from the input to the output end, the larger opening at the input end for providing a pressure drop when coupled to the smaller output opening of another said arcuate tubular conduit.

4. In combination:
    a first conduit for carrying granular material conveyed by pneumatic pressure, said conduit having an outlet opening;
    a tubing bend comprising an arcuate conduit having a constant radius of curvature and an axial bore;
    said tubing bend having an inlet opening at one end of said bore; means air-tightly coupling the inlet opening of said tubing bend to the outlet opening of said first conduit; said tubing bend inlet opening being larger than said first conduit outlet opening for reducing the pneumatic pressure of pneumatically conveyed granular material received from said first conduit;
    the bore of said tubing bend decreasing gradually from the inlet end to a smaller outlet opening at the other end of the tubing bend.

* * * * *